Dec. 19, 1961  E. L. MARCY  3,013,598
LOCK NUT
Filed April 29, 1958
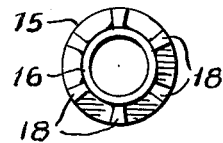
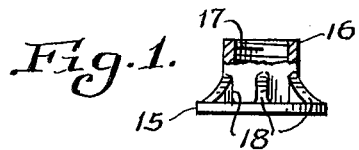
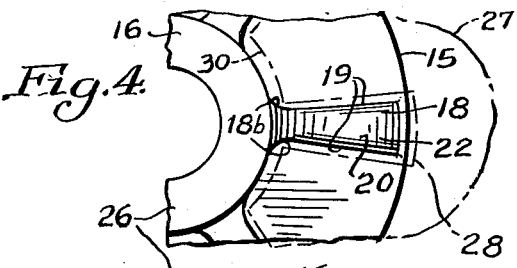
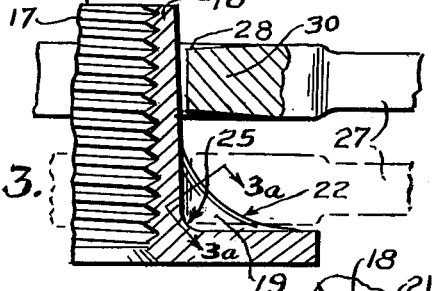
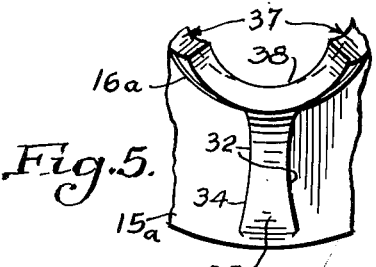
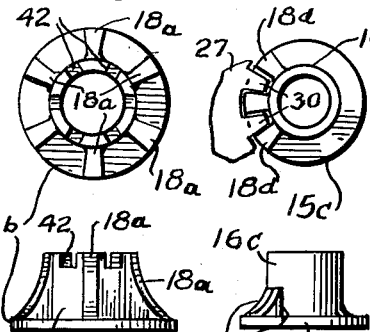
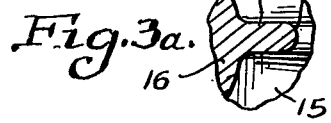
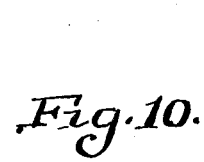
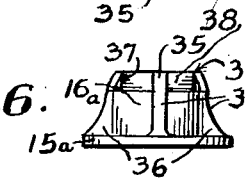
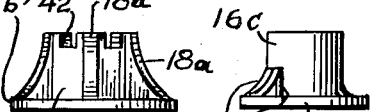
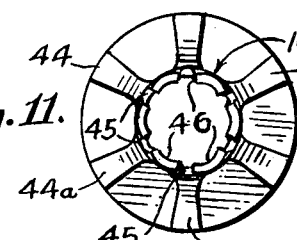
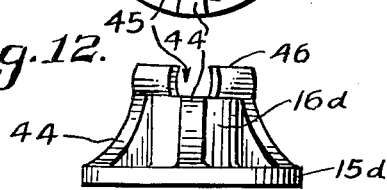
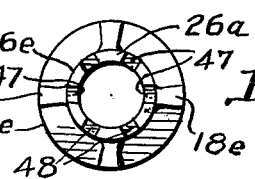
INVENTOR.
ERWIN L. MARCY
BY
Saul B. Miners
ATTORNEY.

United States Patent Office 3,013,598
Patented Dec. 19, 1961

3,013,598
LOCK NUT
Erwin L. Marcy, Fontana, Calif.
(6914 Pine Ave., Bell, Calif.)
Filed Apr. 29, 1958, Ser. No. 731,799
1 Claim. (Cl. 151—21)

My invention relates to improvements in nuts, bolts screws and like fasteners. More particularly, my invention relates to devices as above mentioned which provide additional weight reduction in industries such as aircraft, where lightness of parts is a critical factor.

A primary object of this invention is to provide a nut or the like which is designed for extra strength, even distribution of material, balanced weight, practical fabrication and superior wrenching with standard or non-special tools.

A further object of this invention is to provide a fastener which is adaptable as a nut and bolt retainer, floating nut, gang channel fastener, self-sealing or self-aligning nut, cap nut, headed bolt or screw, lock-nut and the like. This improved design has been found to be adaptable in the use of new alloys and metals for the aircraft and missiles industries.

Another object of this invention is to provide a locking type fastener having a combination of strengthening and weight reducing elements which provide a more springy locking torque.

An important object is to harden a locking nut to the desired hardness of maximum tensile strength and to soften the top portion of the same to provide a springy portion for preventing damage to the bolt threads.

This invention resides in the novel combinations and relationships of elements as set forth in the following specification and particularly pointed out in the appended claim.

In the drawings, like numerals designate like parts throughout.

FIG. 1 is a side elevation, partly in section, of a fastener according to my invention.

FIG. 2 is a top plan view of FIG. 1.

FIG. 3 is a fragmentary, vertical enlarged section of my device and FIG. 3a is a section on the line 3a—3a of FIG. 3.

FIG. 4 is an enlarged top plan view of FIG. 3.

FIG. 5 is a fragment top view of a modified nut shown in FIG. 6, and FIG. 6 is a side elevation of the same.

FIG. 7 is a top plan view of a modified form of nut shown in FIG. 8 and FIG. 8 is a side elevation of the same.

FIG. 9 is a top plan view of a modified nut shown in FIG. 10, and FIG. 10 is a side elevation of the same.

FIG. 11 is an enlarged top plan view of a modified nut shown in FIG. 12 and FIG. 12 is a side elevation of the same.

FIG. 13 is a top plan view of still another modified form of nut.

The numeral 15 designates the flange or base of the fastener, said base having upstanding therefrom a hollow boss or barrel 16, preferably integral with the base and provided with internal threads 17. A plurality of ribs 18, preferably integral with the base and barrel, extending from about midway of the barrel to a point adjacent to the outer rim of base 15.

The ribs 18 are equally and diametrically spaced about the axis of the fastener and the side faces 19 of said ribs 18, see FIG. 4, diverge from the center outward, while the top wall 20 of the ribs are arched or concave as at 22.

Fillets 25 connect the ribs 18 to the barrel 16 and fillets connect said ribs to the base 15. It will be noted that the diverging of ribs 18 permits small ribs for small nuts and large ribs for large nuts, thus maintaining a balance of weight-strength through the various sizes which is important in aircraft and missiles.

The concave top walls 20 of ribs 18 are rounded as shown at 21 of FIG. 3a and provide the requisite strength coupled with important weight saving. This special design of ribs 18 will brace, stiffen and support the base 15 and barrel 16 and equalize stresses and strains with a savings in material in the base and barrel.

The upper edge 26 of barrel 16 may be plain or modified to co-act with various locking means. The base 15 may be of any desired shape. The material used for this fastener may be machine steel, alloy or carbon steel, stainless steel or non-ferrous metals and heat treated to the desired hardness.

The wrenches 27, see FIGS. 3 and 4, may be of the socket, box or open end type as at 28. The lugs 30 of said wrenches are spaced diametrically to slip over the upper edge 26 of barrel 16 and move along the barrel until they engage ribs 18. The lugs can not be displaced laterally because of the diverging shape of the ribs 18. The ribs 18 can also be engaged by the punch and hammer method as used by electricians.

FIGS. 5 and 6 show a modified form of nut wherein the side faces 32 of ribs 34 are concave and the ribs are alternately long as at 35 and short as at 36. A long rib is shown in FIG. 5, with slots 37 aligned with short ribs 36 and the thin upper portion 38 of barrel 16a bent inward at a reduced radius to provide a spring locking device.

FIGS. 7 and 8 show another modification wherein the ribs 18a terminate at the top edge of barrel 16b, and slots 42 are located in the top edge of the barrel between the same. This construction provides a more rigid locking torque.

FIGS. 9 and 10 show a series of diverging ribs 18d grouped together on one side of barrel 16c and base 15c. This form may be useful where only a part turn of the nut is needed to accomplish the desired result.

FIGS. 11 and 12 show a modification wherein the tops of ribs 44 are cut away to form slots 45 while the thin upper portion 46 of barrel 16d is bent inward to provide a more springy locking torque.

FIG. 13 shows a modified nut wherein there are slots 47 in the top edge 26a of barrel 16e at the ribs 18e and also at 48 between the ribs.

It is understood that the heads of bolts, screws and other fasteners may be formed in accordance with my invention, and numerous changes may be made in the materials, shapes and sizes within the scope and spirit of this invention.

I claim:

A lock nut comprising a base, an internally threaded, annular boss integral with said base and disposed inwarly of the outer periphery thereof, and a plurality of radially projecting, circumferentially-spaced buttress-ribs integral between the upper outer edge of the surface of said base and the adjacent side of said boss, said boss including an inwardly springable, locking collar portion at the upper ends of said buttress-ribs for lockingly engaging a threaded element with which said nut engages, said buttress-ribs including a concave arcuate outer edge merging into said base and boss at opposite ends, said buttress-ribs including opposite concave sides converging inwardly from said outer arcuate edge for concentrating compressive force longitudinally along said boss and equalizing torque applied to said buttress-ribs when the lock nut is twisted onto a cooperating threaded element, said inwardly springable, locking collar portion including circumferentially spaced notch portions, said locking collar portion formed by said spaced notch portions being bent inwardly to provide a spring locking device.

References Cited in the file of this patent

UNITED STATES PATENTS

| | | |
|---|---|---|
| D. 134,789 | Gade | June 12, 1943 |
| 760,682 | Card | May 24, 1904 |
| 1,397,876 | Meldal | Nov. 22, 1921 |
| 2,349,513 | Mortus | May 23, 1944 |
| 2,393,520 | Crowther | Jan. 22, 1946 |
| 2,879,820 | Trzcinski | Mar. 31, 1959 |

FOREIGN PATENTS

| | | |
|---|---|---|
| 4,315 | Great Britain | Nov. 7, 1876 |
| 186,662 | Great Britain | Oct. 10, 1922 |
| 607,984 | France | July 12, 1926 |
| 156,457 | Austria | July 19, 1939 |
| 690,543 | Great Britain | Apr. 22, 1953 |
| 707,614 | Great Britain | Apr. 21, 1954 |